US010549722B2

(12) United States Patent
Bilik et al.

(10) Patent No.: US 10,549,722 B2
(45) Date of Patent: Feb. 4, 2020

(54) RADAR-BASED VEHICLE PERIMETER SECURITY AND CONTROL

(71) Applicant: GM Global Technology Operations LLC, Detroit, MI (US)

(72) Inventors: Igal Bilik, Rehovot (IL); Shahar Villeval, Tel Aviv (IL); Eli Tzirkel-Hancock, Ra'anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 759 days.

(21) Appl. No.: 15/190,403

(22) Filed: Jun. 23, 2016

(65) Prior Publication Data

US 2017/0369034 A1    Dec. 28, 2017

(51) Int. Cl.
*B60R 25/31*    (2013.01)
*B60R 25/01*    (2013.01)
(Continued)

(52) U.S. Cl.
CPC ............. *B60R 25/31* (2013.01); *B60R 25/01* (2013.01); *B60R 25/2045* (2013.01); *B60R 25/34* (2013.01); *E05B 81/64* (2013.01); *G01S 7/006* (2013.01); *G01S 7/415* (2013.01); *G01S 13/42* (2013.01); *G01S 13/88* (2013.01); *G01S 13/931* (2013.01); *G07C 9/00309* (2013.01); *B60R 2325/105* (2013.01); *G01S 2013/936* (2013.01);
(Continued)

(58) Field of Classification Search
CPC ..... B60R 25/31; B60R 25/01; B60R 25/2045; B60R 25/34; B60R 2325/105; E05B 81/64; G01S 7/006; G01S 7/415; G01S 13/42; G01S 13/88; G01S 13/931; G01S 2013/9339; G01S 2013/936; G01S 2013/9375; G01S 2013/9378; G01S 2013/9385; G07C 9/00309; G07C 2209/63
USPC ............................................. 342/57
See application file for complete search history.

(56) References Cited

U.S. PATENT DOCUMENTS 4,383,242 A * 5/1983 Sassover ............. B60R 25/1001
                                                          180/287
5,070,334 A * 12/1991 Commissaire .......... G01S 7/023
                                                          342/125
(Continued)

FOREIGN PATENT DOCUMENTS

CN    201128393 A    10/2008
CN    204010077 U    12/2014
(Continued)

OTHER PUBLICATIONS

Chinese Office Action for CN Application No. 201710414126.7, dated Jan. 8, 2019, pp. 1-7.

*Primary Examiner* — Vladimir Magloire
*Assistant Examiner* — Nuzhat Pervin
(74) *Attorney, Agent, or Firm* — Cantor Colburn LLP

(57) ABSTRACT

A method and system perform perimeter security and control of a vehicle. The system includes a radar system arranged in the vehicle, a maximum range of the radar system being less than 100 meters, and a communication unit to communicate with the radar system. The system also includes a control system of the vehicle to control the platform based on the radar system. The control system dynamically controls each door of the vehicle according to a location of the communication unit relative to the platform.

16 Claims, 3 Drawing Sheets

(51) Int. Cl.
   *B60R 25/20* (2013.01)
   *B60R 25/34* (2013.01)
   *E05B 81/64* (2014.01)
   *G01S 7/41* (2006.01)
   *G01S 13/42* (2006.01)
   *G01S 13/88* (2006.01)
   *G07C 9/00* (2006.01)
   *G01S 7/00* (2006.01)
   *G01S 13/93* (2006.01)

(52) U.S. Cl.
   CPC .............. *G01S 2013/9339* (2013.01); *G01S 2013/9375* (2013.01); *G01S 2013/9378* (2013.01); *G01S 2013/9385* (2013.01); *G07C 2209/63* (2013.01)

(56) References Cited

U.S. PATENT DOCUMENTS

| | | | | |
|---|---|---|---|---|
| 5,146,215 | A * | 9/1992 | Drori | B60R 25/1004 340/426.14 |
| 5,920,278 | A * | 7/1999 | Tyler | G01S 5/14 342/140 |
| 7,961,094 | B2 * | 6/2011 | Breed | G08B 13/2491 340/541 |
| 8,054,158 | B2 * | 11/2011 | Nakashima | G07C 9/00309 340/5.61 |
| 8,095,267 | B2 * | 1/2012 | Mino | B60R 25/24 340/426.1 |
| 8,115,620 | B2 * | 2/2012 | Breed | G01F 23/20 340/431 |
| 8,237,544 | B2 * | 8/2012 | Nakashima | B60R 25/24 340/5.61 |
| 8,410,945 | B2 * | 4/2013 | Breed | B60C 11/24 340/601 |
| 8,527,152 | B2 * | 9/2013 | Shibagaki | B60R 25/245 701/22 |
| 9,211,811 | B2 * | 12/2015 | Breed | B60C 11/24 |
| 9,689,982 | B2 * | 6/2017 | Herthan | E05B 83/16 |
| 2003/0212480 | A1 * | 11/2003 | Lutter | B60R 21/013 701/31.4 |
| 2005/0046584 | A1 * | 3/2005 | Breed | B60C 11/24 340/13.31 |
| 2006/0208169 | A1 * | 9/2006 | Breed | B60N 2/002 250/221 |
| 2008/0094212 | A1 * | 4/2008 | Breed | G08B 13/1663 340/541 |
| 2008/0169965 | A1 * | 7/2008 | Minichshofer | G01S 13/931 342/70 |
| 2009/0135044 | A1 * | 5/2009 | Sutphin | G01S 7/006 342/22 |
| 2010/0171588 | A1 * | 7/2010 | Chutorash | G07C 9/00182 340/5.71 |
| 2011/0095940 | A1 * | 4/2011 | Breed | G01F 23/20 342/146 |
| 2012/0028680 | A1 * | 2/2012 | Breed | B60C 11/24 455/556.1 |
| 2013/0035901 | A1 * | 2/2013 | Breed | B60C 11/24 702/188 |
| 2014/0070943 | A1 * | 3/2014 | Breed | E05F 15/43 340/539.11 |
| 2014/0111315 | A1 * | 4/2014 | Geerlings | G07C 9/00309 340/12.5 |
| 2017/0197588 | A1 * | 7/2017 | Flick | B60R 25/30 |

FOREIGN PATENT DOCUMENTS

| | | | | |
|---|---|---|---|---|
| GB | 1500289 A | * | 2/1978 | ............. G01S 5/14 |
| JP | 10211819 A | | 8/1998 | |
| JP | 2003269023 A | * | 9/2003 | ............. B60E 25/01 |
| JP | 2005054487 A | * | 3/2005 | ............. B60E 25/01 |
| JP | 2013216251 A | * | 10/2013 | ............. B60E 25/01 |

* cited by examiner

RADAR-BASED VEHICLE PERIMETER SECURITY AND CONTROL

FIELD OF THE INVENTION

The subject invention relates to radar-based vehicle perimeter security and control.

BACKGROUND

Vehicle systems are increasingly integrated with security features that enhance convenience. For example, a vehicle may be unlocked merely by approaching the vehicle with a key fob. As another example, the trunk or tailgate may be opened by performing a motion while possessing a key fob. These conveniences are based on default or programmable settings. For example, the vehicle owner may program the vehicle to open only the driver door or all doors when the key fob is within the requisite proximity. While particular features may be pre-programmed, those features are not controlled dynamically based on information relating to the vehicle perimeter. Accordingly, it is desirable to provide radar-based vehicle perimeter security and control.

SUMMARY OF THE INVENTION

In an exemplary embodiment of the invention, a perimeter security and control system of a vehicle includes a radar system arranged in the vehicle, a maximum range of the radar system being less than 100 meters; a communication unit configured to communicate with the radar system; and a control system of the vehicle configured to control the platform based on the radar system, wherein the control system dynamically controls each door of the vehicle according to a location of the communication unit relative to the platform.

In another exemplary embodiment, a method of performing perimeter security and control in a vehicle includes transmitting signals from an array of transmit elements of a radar system in the vehicle, a maximum range of the radar system being less than 100 meters; processing received signals resulting from the signals; performing security actions based on the received signals indicating a security threat; and performing control actions based on the received signals indicating a communication unit associated with the vehicle, the control actions including dynamically controlling each door of the vehicle according to a location of the communication unit relative to the platform.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
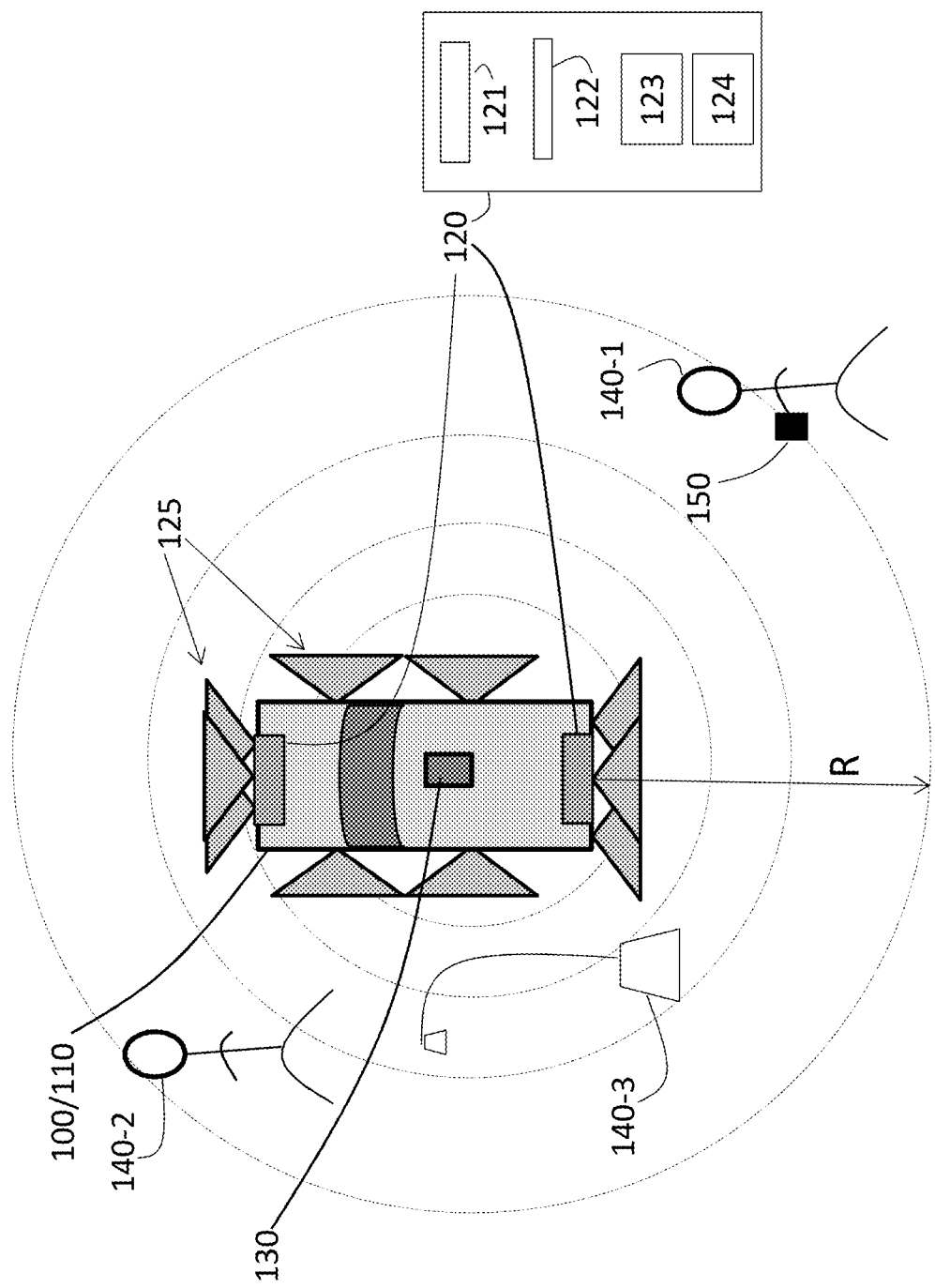
FIG. 1 depicts a vehicle that includes a radar system according to one or more embodiments.

The following description is merely exemplary in nature and is not intended to limit the present disclosure, its application or uses. It should be understood that throughout the drawings, corresponding reference numerals indicate like or corresponding parts and features.

As noted previously, currently available vehicle security and control features may be programmed but are not dynamically determined based on vehicle perimeter information. Thus, while a vehicle owner may specify that the driver door should be unlocked when the key fob is within a detectable range, the vehicle owner cannot specify that whichever door the key fob is closest to should be opened. Thus, for example, if the vehicle owner is approaching the vehicle holding a child seat that must be put in the back seat, the back door would not automatically be unlocked. Embodiments of the systems and methods detailed herein relate to radar-based vehicle perimeter security. According to one or more embodiments, an ultra-short range radar system is used.

In accordance with an exemplary embodiment of the invention, FIG. 1 depicts a vehicle 100 that includes a radar system 120 according to one or more embodiments. The vehicle 100 may be an automobile 110. According to alternate embodiments, the vehicle 100 may be farm equipment, construction equipment, or a device in an automated manufacturing facility, for example. When the vehicle 100 is an automobile 110, the perimeter control includes unlocking doors, a trunk, or a tailgate, and may additionally include opening the door, trunk, or tailgate.

According to one or more embodiments, the radar system 120 is an ultra-short range radar system. An ultra-short radar system is well-suited to a vehicle application in which longer detection ranges may increase false alarms. A long-range radar system is well-known. Comparatively, a long-range radar system requires higher power and provides a narrower field of view. A short-range radar system is also well-known. Ultra wideband pulses (e.g., greater than 500 megahertz wide) may be used, for example, to achieve a wider field of view than a long-range radar system with lower power requirements. The maximum range may be on the order of 150 meters, for example. The ultra-short range radar system requires even less power than the short-range radar system and provides an even wider field of view and shorter maximum range, as detailed below. The ultra-short range radar system achieves the characteristics discussed further herein based on the transmit power and other system parameters. The size of the ultra-short range radar system is smaller as compared with the sizes of long-range and short-range radar systems (for the same number of elements). As such, more ultra-short range radar systems or their associated transmit and receive elements 121, 122 may be used in a given space. For example, while four short-range radar systems may be disposed in an automobile 110, ten or twelve ultra-short range radar systems may be disposed in the same automobile 110.

As noted, the radar system 120 is an ultra-short range radar system. The field of view may be on the order of 90 degrees, and the maximum range may be on the order of 20 meters (e.g., less than 100 meters). In the automobile 110 application, the range resolution, which is on the order of centimeters (e.g., 4 centimeters), may be especially helpful in resolving which door a communication unit 150 is closest to and, thus, which door to unlock, for example. The radar system 120 may be a multi-input multi-output (MIMO) system that includes an array of transmit elements 121 and an array of receive elements 122. The radar system 120 may have a dedicated processor 123 and memory device 124 or may share processing resources of the vehicle 100 (e.g., controller 130) to generate the transmitted signals 125 and process the received signals. As shown in FIG. 1, the radar system 120 may be comprised of more than one array at different locations of the vehicle 100. That is, more than one radar system 120 or more than one array of transmit elements 121 and receive elements 122 may be considered as a radar system 120. The transmitted signals 125 indicated at the sides of the automobile 110 in FIG. 1 may be associated with one or more other arrays of the radar system 120 that are not shown. As previously noted, the range R of detection is ultra-short (e.g., the maximum range is on the order of 10-20 meters) and the energy level needed for the transmission is low. The transmission by each transmit element 121 of the radar system 120 may be done in turn according to a time division multiple access (TDMA) scheme. Transmission may instead be done simultaneously with a different code transmitted by each transmit element 121 of the radar system 120. For example, the transmission by each transmit element 121 may be a different linear frequency modulation continuous wave (LFM-CW).

Because of the array of transmitters (121), the MIMO radar system 120 may determine the position of a reflection source (i.e., target 140) relative to the platform 100. That is, the strength of the reflection from a target 140 resulting from the transmitted signal 125 of each transmit element 121 facilitates the determination of location. A controller 130 uses information from the radar system 120 to make security and control decisions. The controller 130 may include an application specific integrated circuit (ASIC), an electronic circuit, a processor (shared, dedicated, or group) and memory that executes one or more software or firmware programs, a combinational logic circuit, and/or other suitable components that provide the described functionality.

In FIG. 1, three targets 140-1, 140-2, 140-3 (generally, 140) are shown. The first target 140-1 possesses a communication unit 150, which is a short-range transceiver. Prior art key fobs may transmit a radio signal when a button is pressed, for example. This radio signal may be used to control the door locks or tailgate. According to one or more embodiments, the communication unit 150 receives a signal from the radar system 120 in the vehicle 110. The communication unit 150 may then transmit a modulated version of the received signal. For example the communication unit 150 may code the received signal or may shift the frequency of the received signal before transmitting back to the vehicle 100. When the signal from the communication unit 150 is received at the vehicle 100, the controller 130 may unlock or open the door closest to (and being approached by) the communication unit 150. Conversely, when the communication unit 150 is determined to be moving away from the vehicle 100, the doors may be locked. There may be a threshold range of the communication unit 150 (from the vehicle 100) within which doors are unlocked or opened and outside of which doors are locked.

The second target 140-2 is a moving target (e.g., person) that does not possess a communication unit 150. The radar system 120, the controller 130, or a combination of the two may determine that the target 140-2 is not associated with a communication unit 150 based on the reflection not being modulated (e.g., coded, shifted in frequency). The movement of the second target 140-2 may be monitored over time, and a potential security threat may be identified based on recognized behaviors. The recognized behaviors may include presence for a length of time (i.e., the target 140-2 has loitered near the vehicle 100 for a threshold period of time) or a specific recognized action. For example, if it is determined that the second target 140-2 has moved from door to door of the automobile 110, the target 140-2 may be deemed to be a potential automobile thief. When a potential security threat is detected, an alarm may be activated until the target 140-2 retreats. Based on the communication capabilities of the vehicle 100, the owner may be informed based via a cellular device, for example. The third target 140-3 is a stationary target (e.g., lamp post). The target 140-3 may be determined to be stationary based on the lack of movement indicated by reflections received over time.

Figure 2:
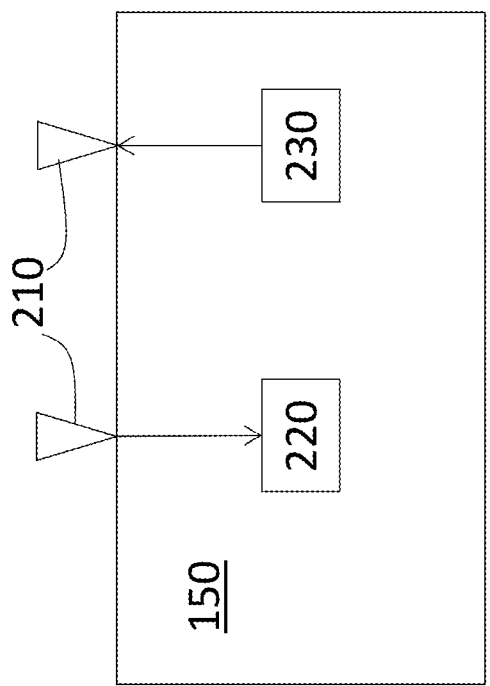
FIG. 2 is a block diagram of a communication unit according to one or more embodiments.

FIG. 2 is a block diagram of a communication unit 150 according to one or more embodiments. The communication unit 150 is shown with one antenna 210 to receive signals and another antenna 210 to transmit signals. In alternate embodiments, there may be a single antenna 210 used for transmission and reception. The receive portion 220 may recognize the transmission as being associated with the same vehicle 100 as the communication unit 150. The recognition may be based on the one or more codes transmitted by the transmit elements of the radar system 120. In response, the transmit portion 230 may generate a modulated signal (e.g., shifted in frequency, coded) for transmission back to the vehicle 100. The communication unit 150 includes other known components (e.g., battery) that are not detailed.

Figure 3:
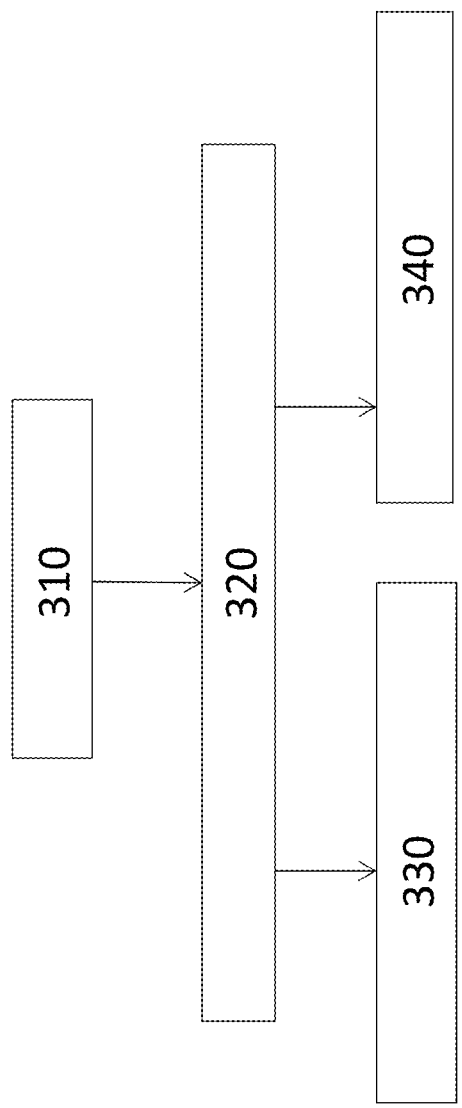
FIG. 3 is a process flow of a method of performing perimeter security and control in a vehicle according to one or more embodiments.

FIG. 3 is a process flow of a method of performing perimeter security and control in a vehicle 100 according to one or more embodiments. At block 310, signals are transmitted from the radar system 120. Based on the transmit power and other parameters, the transmissions result in ultra short-range detection (e.g., maximum range of 10-20 meters). The reduced range reduces the false alarms that may result if the range of the radar system 120 were longer. Processing received signals to identify targets 140, at block 320, includes processing reflections as well as signals transmitted by the corresponding communication unit 150. The processing also includes recognizing received signals from a communication unit 150 associated with the vehicle 100 in which the radar system 120 resides. The communication unit 150 may be recognized based on the communication unit 150 transmitting a modulated signal based on receiving a signal from the radar system 120. Processing received signals (at block 320) also includes identifying security threats. Performing security actions, at block 330, is based on identifying a target 140 (at block 320) that is not associated with a communication device 150. The target 140 is monitored, and if the target 140 is determined as a security threat, the security actions may include sounding an alarm or alerting the owner of the vehicle 100. Performing control actions, at block 340, is based on identifying a target (at block 320) as being associated with the communication device 150. The control actions include unlocking or opening a door closest to the communication unit 150.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A perimeter security and control system of a vehicle, the system comprising:
a radar system arranged in the vehicle, a maximum range of the radar system being less than 100 meters;
a communication unit configured to communicate with the radar system; and
a control system of the vehicle configured to control the vehicle based on the radar system, wherein the control system dynamically controls each door of the vehicle according to a location of the communication unit relative to the vehicle, wherein the communication unit modulates a received signal received from the radar system to generate a modulated signal and transmits the modulated signal to the radar system.

2. The system according to claim 1, wherein a range resolution of the radar system is on the order of centimeters.

3. The system according to claim 1, wherein the communication unit shifts a frequency of the received signal to generate the modulated signal.

4. The system according to claim 1, wherein the communication unit codes the received signal to generate the modulated signal.

5. The system according to claim 1, wherein the control system determines a location of the communication unit relative to the vehicle.

6. The system according to claim 5, wherein the control system unlocks the door of the vehicle closest to the communication unit based on the location.

7. The system according to claim 1, wherein the control system identifies a moving target other than the communication unit that is proximate to the vehicle.

8. The system according to claim 7, wherein the control system indicates a security threat based on the moving target.

9. A method of performing perimeter security and control in a vehicle, the method comprising:
transmitting signals from an array of transmit elements of a radar system in the vehicle, a maximum range of the radar system being less than 100 meters;
processing received signals resulting from the signals;
performing security actions based on the received signals indicating a security threat; and
performing control actions based on the received signals indicating a communication unit associated with the vehicle, the control actions including dynamically controlling each door of the vehicle according to a location of the communication unit relative to the vehicle, wherein the processing the received signals includes detecting a modulation of the signals transmitted by the radar system by the communication unit.

10. The method according to claim 9, wherein the detecting the modulation includes detecting a frequency shift.

11. The method according to claim 9, wherein the detecting the modulation includes detecting a modulation code.

12. The method according to claim 9, wherein the processing the received signals includes determining a location of the communication unit relative to the vehicle.

13. The method according to claim 12, wherein the performing the control actions includes unlocking the door of the vehicle closest to the communication unit based on the location.

14. The method according to claim 9, wherein the processing the received signals includes identifying a moving target other than the communication unit.

15. The method according to claim 14, further comprising identifying the moving target as the security threat based on performing behavior analysis.

16. The method according to claim 15, wherein the performing the behavior analysis includes monitoring a duration of time that the moving target is detected or monitoring a movement of the moving target relative to the vehicle.

* * * * *